United States Patent
Chakraborty et al.

(10) Patent No.: US 10,129,059 B2
(45) Date of Patent: Nov. 13, 2018

(54) LOW LATENCY MULTI-AMPLITUDE MODULATION RECEIVER

(71) Applicant: Texas Instruments Incorporated, Dallas, TX (US)

(72) Inventors: Sudipto Chakraborty, Plano, TX (US); Vinod Mukundagiri, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 11 days.

(21) Appl. No.: 15/597,986

(22) Filed: May 17, 2017

(65) Prior Publication Data

US 2017/0353337 A1 Dec. 7, 2017

Related U.S. Application Data

(60) Provisional application No. 62/345,292, filed on Jun. 3, 2016.

(51) Int. Cl.
| | |
|---|---|
| *H04L 27/06* | (2006.01) |
| *H04B 1/10* | (2006.01) |
| *H04B 1/40* | (2015.01) |
| *H04L 25/06* | (2006.01) |

(52) U.S. Cl.
CPC .......... *H04L 27/06* (2013.01); *H04B 1/1027* (2013.01); *H04B 1/40* (2013.01); *H04L 25/063* (2013.01)

(58) Field of Classification Search
CPC ..... H04L 27/06; H04L 25/063; H04B 1/1027; H04B 1/40
See application file for complete search history.

(56) References Cited

U.S. PATENT DOCUMENTS

| | | | |
|---|---|---|---|
| 6,504,867 B1* | 1/2003 | Efstathiou | H04L 27/2273 375/227 |
| 9,455,758 B1* | 9/2016 | Roberts | H04B 1/3827 |
| 2004/0152429 A1* | 8/2004 | Haub | H04B 1/1027 455/102 |
| 2005/0046603 A1* | 3/2005 | Chang | H04L 25/063 341/155 |

(Continued)

*Primary Examiner* — Janice Tieu
(74) *Attorney, Agent, or Firm* — Ronald O. Neerings; Charles A. Brill; Frank D. Cimino

(57) ABSTRACT

A multi-amplitude modulation receiver includes a signal coupler block coupled to a mixer array block receiving a first input signal from the signal coupler block and a second input from a LO circuit that provides N overlapping phase signals. Outputs of the N mixer elements are coupled to a baseband filter (BBF) block then to a decision threshold block including decision threshold elements including a signal input and at least one comparator receiving at least one $V_{TH}$ value. A phase ordering and mapper block selects M out of the N phases. A digital logic and control block is coupled to control a filter gain and corner frequency of the BBF block and control the $V_{TH}$ value for the decision threshold block which compares a signal received to the $V_{TH}$ value. Outputs from the decision threshold block are coupled inputs of an M-input decision combiner which provides a single data output.

20 Claims, 6 Drawing Sheets

(56) References Cited

U.S. PATENT DOCUMENTS

| | | | |
|---|---|---|---|
| 2013/0202061 A1* | 8/2013 | Chandrasekaran | H04L 25/06 375/317 |
| 2016/0191090 A1* | 6/2016 | Nakanishi | H04B 1/1027 375/346 |
| 2017/0104508 A1 | 4/2017 | Mukundagiri et al. | |

* cited by examiner

LOW LATENCY MULTI-AMPLITUDE MODULATION RECEIVER

CROSS REFERENCE TO RELATED APPLICATIONS

This application claims the benefit of Provisional Application Ser. No. 62/345,292 entitled "LOW LATENCY ASK DETECTOR", filed Jun. 3, 2016, which is herein incorporated by reference in its entirety.

FIELD

Disclosed embodiments relate to pulse amplitude modulation receivers.

BACKGROUND

Amplitude Shift Keying (ASK) is a type of amplitude modulation which represents binary data in the form of variations in the amplitude of a signal. The modulated signal has a high frequency carrier. A special case of ASK is known as On-OFF Keying (OOK) which uses only two amplitude levels. The binary signal when it is ASK modulated gives a zero value for a Low input while it gives the carrier output for High input. The ASK modulated signal upon receipt is demodulated by an ASK demodulator (or receiver). ASK can be generalized depending on how many possible levels of amplitude the signal can have to represent the data. Another known pulse amplitude modulation is 4-PAM which has 4 amplitude levels to represent the data.

There are two types of pulse amplitude demodulation techniques, being Asynchronous Demodulation/detection and Synchronous Demodulation/detection. When the clock frequency at the transmitter becomes substantially close to the clock frequency of the receiver, it is known as a synchronous detection method, as the frequency gets synchronized. Otherwise, the demodulation is known as asynchronous detection.

SUMMARY

This Summary briefly indicates the nature and substance of this Disclosure. It is submitted with the understanding that it will not be used to interpret or limit the scope or meaning of the claims.

Disclosed embodiments recognize in high data rate signal processing applications such as for multi-amplitude modulation receivers low signal latency is needed. Conventional multi-amplitude modulation receivers generally comprise a down-conversion mixer, which translates the received signal at a radio frequency to a low frequency or baseband, using multiple phase of clock generated from a local oscillator, where outputs from the baseband filter are provided to an analog to digital converter (ADC). Although some multi-amplitude modulation receivers include mixers, the mixers in such known multi-amplitude modulation receivers are typically controlled with multiple phases of a local oscillator (LO) waveform, where the phases applied to the mixers may operate with non-overlapping phases or may have overlapping phases that lack control using any threshold(s). Disclosed multi-amplitude modulation receivers in contrast include mixers for down conversion which are controlled with N (N>1) overlapping phases that are controlled with at least one voltage threshold ($V_{TH}$). Overlapping phases using one or more $V_{TH}$ has been found to enable glitch-free output signals which as used herein refers to signals that lack undesired signal transitions (see the bottom 3 glitch-free output signal waveforms shown in FIG. 3 described below).

Disclosed embodiments thus include low latency, multiple amplitude receivers that use multiple overlapping phases of the down converted baseband signals, along with at least one threshold voltage $V_{TH}$ for detecting the rising and falling edges of a waveform using a slicer-based asynchronous detector. The receiver uses a phase selector that allows the use of contiguous phases or an alternate sequence for low latency detection of the rising and falling edges. The $V_{TH(s)}$ as well as the phase resolution can be programmable by digitally aided built-in calibration to detect a waveform with a duty cycle substantially close to 50%.

Disclosed embodiments include a multi-amplitude modulation receiver including a signal coupler coupled to a down conversion mixer array block receiving a first input signal from the coupler block and a second input from a LO circuit that provides N overlapping phase signals. Outputs of the N mixer elements are coupled to a baseband filter (BBF) block then to a decision threshold block including decision threshold elements including a signal input and at least one comparator coupled to receive at least one $V_{TH}$ value. A phase ordering and mapper block selects M out of the N phases (M≤N). A digital logic and control block is coupled to control a filter gain and corner frequency of the BBF block and control the $V_{TH}$ value for the decision threshold block which compares the M signals received to the $V_{TH}$ value. Outputs from the decision threshold block are coupled inputs of an M input decision combiner which provides a single data output for the receiver.

BRIEF DESCRIPTION OF THE DRAWINGS

Reference will now be made to the accompanying drawings, which are not necessarily drawn to scale, wherein.

DETAILED DESCRIPTION

Figure 1:
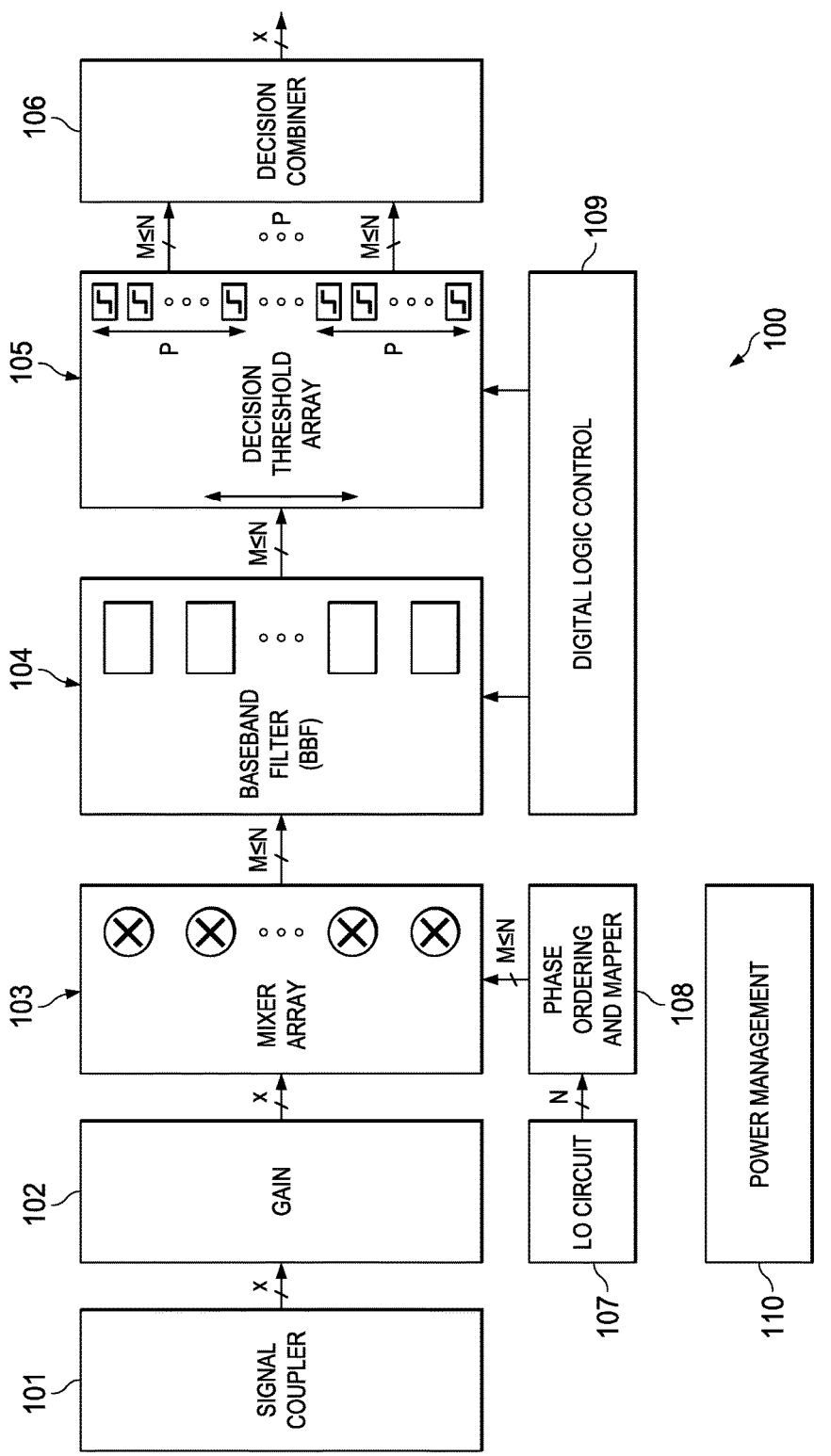
FIG. 1 illustrates blocks of an example low latency multi-amplitude modulation receiver described as an ASK receiver, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed multi-amplitude modulation receivers utilizes a radio-based down conversion approach with mixers clocked with different overlapping multi-phase signals, slicing these signals at baseband using multiple thresholds (voltage thresholds, $V_{TH}S$), and then using an M input digital combiner (e.g., a digital OR function other logic) of all the outputs to declare a valid data signal at the output. Latency can be reduced with a higher carrier frequency and/or more phase granularities at a given frequency, and/or increasing the number of $V_{TH}S$ used.

FIG. 1 provides a block diagram of an example low latency multi-amplitude receiver 100. Receiver 100 comprises a signal coupler block 101, where the X shown=1 or 2 which stands for single ended or differential signals, described below followed by an optional gain block 102 which provides gain or attenuation that can be at a variable level. The signals output by the signal coupler block 101 are shown by example as two single ended terminals of differential signals (plus and minus polarities). The signal coupler 101 may comprise an antenna (for wireless applications), resonator (e.g., LC tank), or transducer such as a photodetector. For low frequencies and near-field coupled communications (NFC), the signal coupler block 101 can comprise a larger dimension LC tank used as a pickup antenna, instead of a conventional electromagnetic radiator such as a patch antenna.

The gain block 102 may comprise a programmable gain low noise amplifier, or simply a set of passive attenuators when the received signal is large in amplitude. Outputs from the gain block 102 are provided to the down converting mixer array block 103, which comprises N mixer elements (for N phase operation), from which M number of elements (M≤N) may be enabled (selected) by signals received from the phase ordering and mapper block 108. Hence, the mixer array block 103 includes a plurality of N mixer elements each potentially operating concurrently on the received signal (receiving single ended signal, x=1 or differential, x=2). The N mixer elements can comprise transistors with voltage mode switches, or transistors with current mode switches.

The respective mixer elements receive two inputs and provide one output. The first input is shown as a differential RF signal from the signal coupler block 101 that can also be single ended and the second input being a phase shifted version of the LO circuit's 107 clock, and the output of the respective mixer elements in the mixer array block 103 is a baseband signal. Outputs from the mixer array block 103 are provided to the baseband filter (BBF) block 104 comprising M filter elements operating concurrently, which is responsible for filtering out the unwanted power path signal in the case of wireless power transfer applications.

The decision threshold block 105 comprises M (≤N) clusters of slicer elements (see slicer elements $105_1$ to $105_N$ in FIG. 2 described below), where each slicer element comprises P (P≥1) comparison elements. Each of the comparison elements generally use a slightly different threshold voltage ($V_{TH}$) to reduce the latency of detection. The P sets of outputs generated by the decision threshold block 105 each containing M decision values are coupled to the decision combiner block 106, which provides a single ended (x=1) or a differential (x=2) single output. Decision combiner block 106 can comprise an M-input OR gate or a pulse stretcher logic shown providing a single output without any glitches.

The LO circuit 107 can comprise a phase locked loop or frequency locked loop followed by a divide-by-N element to generate the N phases generally each with about a 50% duty cycle, and the LO circuit's 107 output is coupled to the phase ordering and mapper block 108 which is coupled to an input of the mixer array block 103 that selects M out of N contiguous phases. Contiguous phases are used to maximize overlap, which allows lowest possible latency due to the use of lowest possible $V_{TH}$ value.

The digital logic control block 109 provides the necessary controls for calibration and programming that is coupled to BBF block 104 and to the decision threshold block 105. The power management unit 110 shown provides the voltage and current levels needed for receiver operations. The digital logic control block 109 can receive inputs for trim settings, mode inputs to enable setting the receiver in a correct state of operation from memory cells controlled through a processor. Although not shown in FIG. 1, power management unit 110 provides outputs to control voltage and current levels for most of the blocks shown in FIG. 2 including the mixer array block 103, BBF block 104 and the decision threshold block 105. Power management unit 110 receives inputs regarding the power supply of the chip may also receive inputs from the digital logic control block 109 or a processor to set it in the correct mode.

Figure 2:
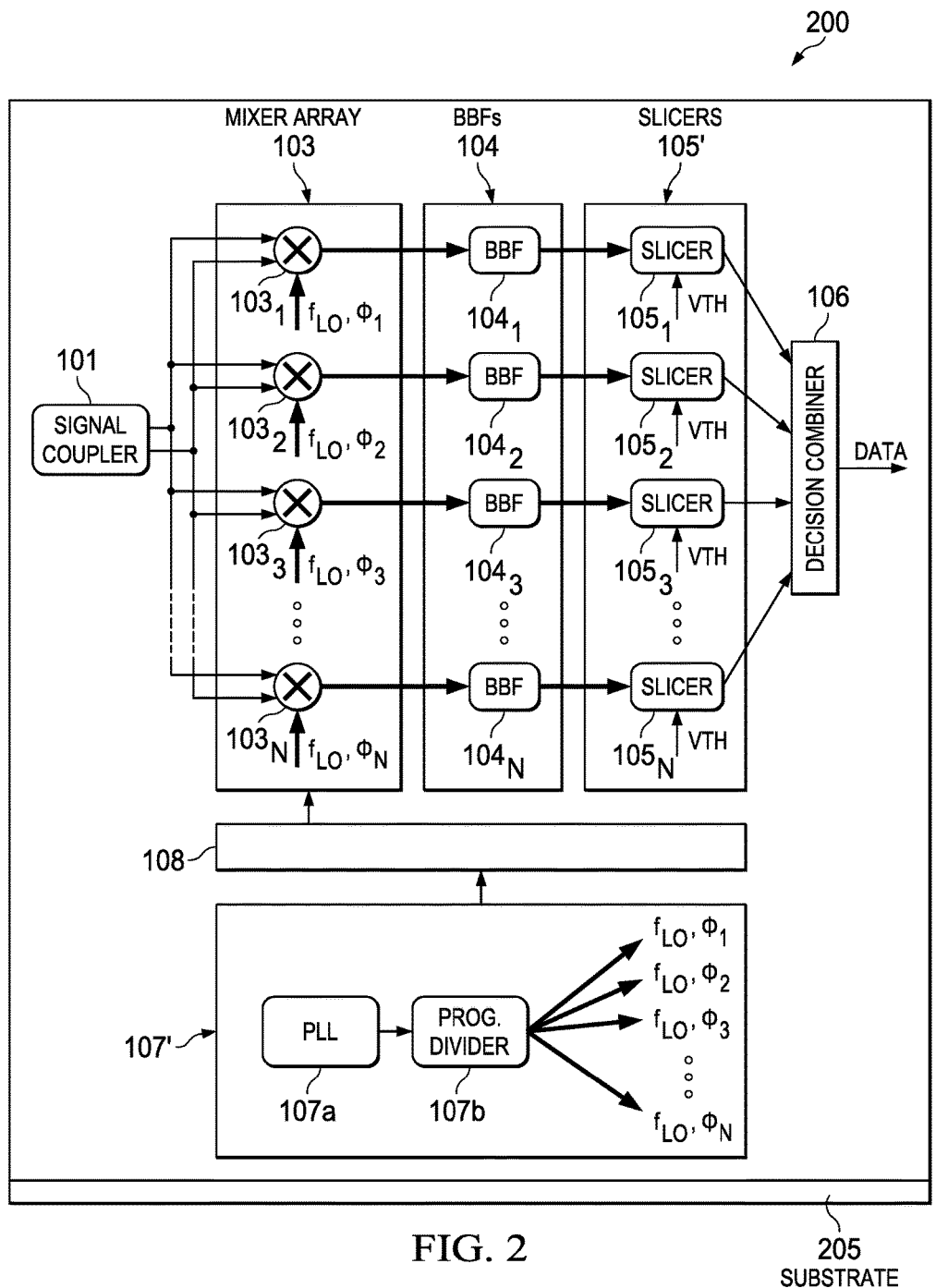
FIG. 2 illustrates block level details for one implementation of the ASK receiver shown in FIG. 1.

FIG. 2 illustrates blocks of an example low latency pulse amplitude modulation ASK receiver 200 with the decision threshold block 105 shown in FIG. 1 now shown as a multi-phase slicer block 105'. The ASK receiver 200 is also now shown formed on a substrate 205, such as a silicon substrate. As with ASK receiver 100, ASK receiver 200 includes a signal coupler block 101 coupled to a mixer array block 103 shown comprising mixer elements $103_1$ (for channel 1), $103_2$, $103_3$ and $103_N$ (for channel N).

Although not shown in FIG. 2, corresponding to the gain block 102 shown in FIG. 1 a low noise amplifier (LNA) may also be added to achieve better sensitivity if necessary between the signal coupler block 101 and the mixer array block 103. The phase ordering and mapper block 108 as described above can comprise selection logic to select an appropriate M phases out of the N phases which is coupled to phase inputs of the mixer array elements of mixer array block 103 to provide a near 50% duty cycle of the output pulse. The LO circuit 107' is shown comprising a phase lock loop 107a which is coupled to a programmable phase divider 107b that generates multiple phases shown outputting N phase signals $f_{LO}, \varphi_1, f_{LO}, \varphi_2, f_{LO}, \varphi_3, f_{LO}, \varphi_N$ (all at the same frequency with different phases), that are coupled to the phase input of the respective mixer elements in the mixer array block 103. The PLL 107a can also comprise a crystal (which would generally be off the substrate 205/chip) along with a frequency divider, or a ring oscillator.

The outputs of the respective mixer elements in the mixer array block 103 are coupled to analog baseband gain/filtering stages shown as BBF block 104 comprising BBF elements $104_1$, BBF $104_2$, BBF $104_3$ and BBF $104_4$ to provide filtered signals to the slicer elements in the slicer block 105' comprising slicer element $105_1$, slicer $105_2$, slicer $105_3$ and slicer element $105_N$ with good signal strength for detection. As described above the respective slicer elements comprise at least one comparator used to compare the voltage of the baseband signal received from the BBF elements in the BBF block 104 to the respective $V_{TH}$ values as shown in FIG. 2.

Baseband signals received by the slicer elements in the slicer block 105' are compared against these reference $V_{TH}$ values and a decision is made depending on whether the received signal is above or below the $V_{TH}$ value. The single $V_{TH}$ level shown in FIG. 2 or alternatively different $V_{TH}$ levels for each of the N channels can be generated by a processor (not shown) such as a microprocessor, digital signal processor (DSP), or a microcontroller unit (MCU). $V_{TH}$ values are generally determined as a function of the front-end gain of the receiver, and the output noise floor of the BBF block 104 to obtain the desired noise margin for best detection.

There can be various methods of calculating these $V_{TH}$ value(s), including both static and dynamic. In a static $V_{TH}$ value generation configuration, the $V_{TH}$ value is fixed and all the baseband waveforms can be computed based on this fixed $V_{TH}$ value. This fixed $V_{TH}$ value however can be programmed using digital control bits, and can be computed based on the number (N) of phases used, and the effective noise at the receiver output (data output of the decision combiner block 106).

The outputs from the respective slicer elements in the slicer block 105' are shown coupled to the decision combiner block 106. The "Data" shown in FIG. 2 output by the decision combiner block 106 is generally coupled to a digital demodulator, or a synchronizer. The digital demodulator simply samples the output data at its optimum point using a sampling clock, and provides the raw data at the back end.

As an example, for a four phase receiver, with a phase overlap and a 50% duty cycle, the phases obtained at the receiver output should be at 0°, 90°, 180°, 270°, and the 0°, 90° phased waveforms become equal to each other in magnitude at 45° phase, and at the intersection point the amplitude value is 0.707 times the waveform amplitude. Similarly, assume that the noise associated with the baseband signal is given by <vn>, where, <vn> is a sum of the actual circuit noise referred to at the output, plus the residual signal noise coming from a power path through the BBF block 104.

Setting the $V_{TH}$ threshold close to the noise level is recognized to lead to the lowest possible latency with respect to the rising edge of the waveform, but is susceptible to errors caused by random noise (as noise typically contains a statistical variation with a long-tailed probability density function). Hence, a choice for error-free detection can be a $V_{TH}$ value which is set in between these two values ($V_{TH}$=<vn>+cos(π/N)*Vp). A built-in calibration engine can be employed to observe essentially error-free signal detection based on a fixed pattern transmitted from the transmitter, which adjusts the $V_{TH}$ value based on the gain setting and the filtering response of the receiver front-end.

Different $V_{TH}$ values can be set for low latency detection in the rising and falling edges of the waveform (see FIG. 3 described below). $V_{TH}$ values can also be dependent on the number of phases used in the system. For example, in the case of four phases, the rising edge detection may use all four phases for robust detection, but the falling edge may use only three of the four phases. Increasing the number of phases leads to more overlap of the pulses after the slicer block 105', and increasing the number of phases in the system will lead to the output waveform nearing a 50% duty cycle, as the rising and falling edges typically present different time constants.

Both the static $V_{TH}$s used for rising and falling edges can be computed by a processor using a precise voltage reference generated on-chip (e.g. bandgap reference), and using a voltage divider precisely controlled by digital code can lead to accurate $V_{TH}$ values. Typically, in wireless charging system application, the rising edges utilize a lower $V_{TH}$ as it has a low time constant, and the falling edge utilizes a higher $V_{TH}$ as the falling edge generally has large time constant. In this way, increasing the number of phases N leads to a near 50% duty cycle while providing low latency. It is also possible that the rising and falling $V_{TH}$ values be higher or lower than the DC common mode of the baseband waveforms, and the polarities of the waveforms at the input of the slicers in the slicer block 105' are reversed in order to achieve the same functionality.

Figure 3:
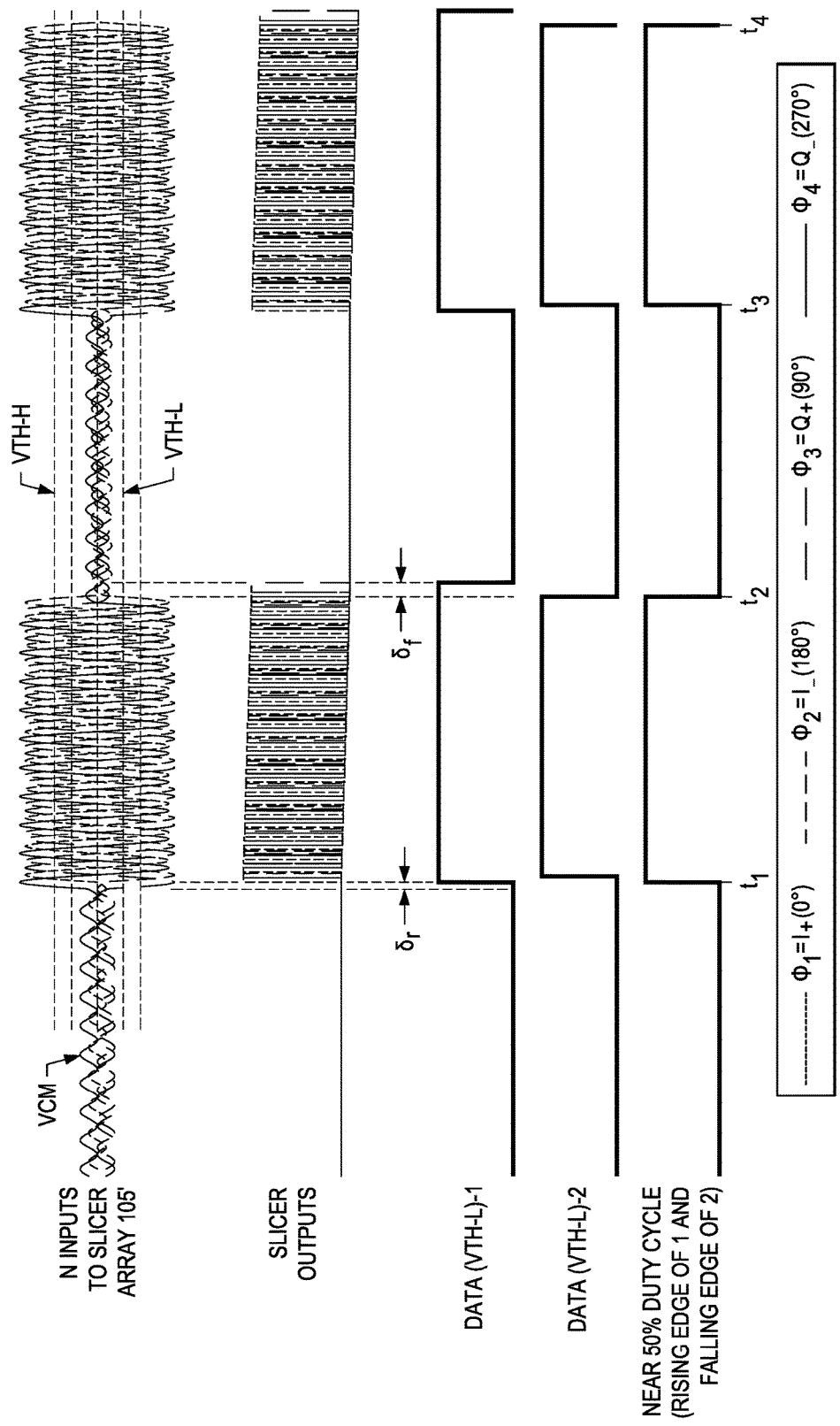
FIG. 3 shows multiphase receiving and multiple $V_{TH}$ setting for low latency ASK receiving, according to an example embodiment.

FIG. 3 provides details of the M≤N phase waveforms, $V_{TH}$ values and common mode settings. Typically, a low $V_{TH}$ value is used for comparing to rising edge and a higher $V_{TH}$ value is used for comparing to the falling edge. As described above the $V_{TH}$ values can be programmable to achieve a substantially close to 50% duty cycle defined herein as being from a 48 to 52% duty cycle. Near 50% duty cycle operation is also possible due to the phase ordering and mapper block 108 which selects a set of M contiguous phases. It is important to note that the $V_{TH}$ values for decision making may be higher or lower than the common mode of the M-phase waveforms. This is observed in the decision threshold block elements.

For example, the function of the decision threshold elements in the decision threshold block 105 may be represented as $Y=\lim[G\times(X-V_{TH})]$, where Y is the output value, X is the input, $V_{TH}$ is the voltage threshold, G is the gain provided to the difference, and "lim" indicates the "limiting" function. The exact same value of Y is obtained when the sign of X and $V_{TH}$ are both reversed. The system design can use a combination of adjustments in $V_{TH}$ value and phase ordering to minimize $\delta_r$ and $\delta_f$. $V_{TH}$ adjustment tries to minimize $\delta_r$ and $\delta_f$, while the phase ordering element tries to make the duty cycle of the data substantially close to 50%. As an example, as described above in a 4-phase system (N=4) the rising edge detection can use four contiguous phases (1, 2, 3, 4) while the falling edge can use only three phases (1, 2, 3) to reduce latency during the falling edge. Typically LC resonators for LO circuit 107 using a moderate quality (Q) factor lead to a sharper rising edge and a slower falling edge, hence the selection of the number of contiguous phases should generally be carefully calibrated to provide an output waveform with a duty cycle that is substantially close to 50%.

It is not necessary for the N overlapping phases to be exactly equal to (π/N), but it is generally important to have at least a 50% overlap in order to reduce the $V_{TH}$ values needed for detection, thereby leading to low latency. The phase shift obtained from the LO circuit 107's signals is generally quite accurate, but fundamentally phase shifts can also be employed in the RF and the baseband sections of the receiver as well. Hence, the N phases utilized by ASK receiver 100 or 200 can be obtained as $N_1$ phases from RF (e.g., from gain block 102), $N_2$ phases from the LO circuit 107, and $N_3$ phases from the BBF block 104 (where N=$N_1$+$N_2$+$N_3$).

Known slicer-based receivers generally provide a fast response, but the output pulses generally still need significant digital signal processing, which inherently increases the latency. To alleviate these shortcomings, disclosed receivers including ASK receiver 200 utilize N overlapping phases $f_{LO}, \varphi_1, f_{LO}, \varphi_2, f_{LO}, \varphi_3, \ldots f_{LO}, \varphi_N$ provided to the respective mixer elements of the mixer array 103. By increasing N, more overlap between the signals input to the slicer elements in the slicer block 105' can be obtained.

For example, two 50% duty cycle signals (typical of LO signals) with a 180° phase shift between them has no overlap, and is recognized to create an undesirable glitch at the data output. However, when 50% duty cycle quadrature waveforms provide 25% overlap between the in-phase (I) and quadrature (Q) signals that is reflected in the outputs of the respective slicer elements in the slicer block 105'. This overlap is recognized to provide robustness and a glitch-free data output because as the number of phases is increased, the operation becomes more robust as the overlap between the phased waveforms at the output of the slicer elements in the slicer block 105' increases. The fractional overlap can be expressed as $f=N-1/2N$, where N is the divider number. For N=2 and programmable phase divider 107b comprising a quadrature divider, this overlap is 25%, and for N=8 the overlap is calculated to increase to ~44%. However, N may also be an odd integer.

FIG. 3 illustrates an example of N=4 baseband waveforms obtained using a disclosed ASK receiver based on ASK receiver 200 receiving pulsed data with a differential quadrature signal (I and Q signals) provided by the LO 107', and hence down converted waveforms output by the mixers in the mixer array 103 using the differential quadrature signals. This is for the specific case of binary ASK, which as noted above is also known as on-off keying (OOK). The differential quadrature signals are shown as $\varphi_1=I_+(0°)$, $\varphi_2=I_-(180°)$, $\varphi_3=Q_+(90°)$, and $\varphi_4=Q_-(270°)$, and a single $V_{TH}$ value was used for each of the mixer elements in the mixer array 103.

The top waveform plot shows the N overlapping phase inputs provided to the slicer elements in the slicer block 105' along with the $V_{TH-L}$ and $V_{TH-H}$ values shown that were provided to the slicers 105$_1$ to 105$_N$, along with the data signals using $V_{TH-L}$ and $V_{TH-H}$ 1-value shown received between $t_1$ and $t_2$ and between $t_3$ and $t_4$. The outputs from the slicer elements in the slicer block 105' collectively provides pulses overlapping in nature. The data in the bottom waveforms labeled DATA(VTH-L)-1 and DATA(VTH-L)-2 can both be seen to be glitch-free with a somewhat faster pulse rise time as compared to the pulse fall time. The bottommost waveform shown is a combination of the DATA(VTH-L)-1 and DATA(VTH-L)-2 waveforms above it which is the final recovered single data output.

The $V_{TH}$ level(s) is generally set to vary with N to achieve a better trade-off between noise margin and latency, where as N increases $V_{TH}$ increases, and where as N decreases $V_{TH}$ decreases. The higher the $V_{TH}$ level the better the noise immunity, and the lower the $V_{TH}$ level, lower the latency (for the rising edge of the waveform resulting from the LO circuit 107). For falling edge, a higher $V_{TH}$ is desirable, as the decay of the LO circuit 107 in the case of an L/C tank takes longer time than the charging phase. The overlap increases for the rising edges, as level of $V_{TH}$ provided to the slicers in the slicer block 105'. However, too low a $V_{TH}$ value will also provide more vulnerability to the unwanted power path signal for wireless power applications, leading to false outputs. Hence, for wireless power applications a trade-off is generally used and the value for $V_{TH}$ can be accurately computed using a built-in calibration engine from the received signal strength, filtering for power path signal, and the front-end gain.

The rising and falling edge propagation delays shown in the data output generated by the decision combiner block 106 can be minimized in a variety of ways. For example, by (a) increasing granularity of the pulses, by using higher IF frequency, or more phases at the same frequency, (b) reducing threshold and using a subset of the phases from all possible phases, and/or (c) using multiple threshold settings and using built in self calibration to set $V_{TH}$ values, in order to utilize the lowest latency output.

Disclosed pulse amplitude modulation receivers have a number of features believed to be unique. Such receivers use a minimum number of filtering stages to reduce the die area, the number of filtering stages may be reduced depending on the blocker strength in the case of wireless power transfer applications to reduce further delay. Disclosed receivers are inherently low power due to use of a mixer-based down conversion approach. Such receivers provide low area, and scale well with conventional semiconductor process technology. Closed loop feedback can be used to achieve gain or attenuation, with automatic gain control (AGC) in real time or static as described below, so that the front-end provides near constant gain with process and temperature variation. The BBFs 104 following the mixer array 103 generally use resistive feedback around an op-amp with high gain-bandwidth where the op-amp gain can be set by the ratio of its two resistors, hence being robust over process and temperature results.

Overlapping clocks along with multiple thresholders essentially eliminate glitch scenarios. Two arrangements are possible. First, all the signals at the baseband can be compared with respect to a fixed $V_{TH}$, where as described above the $V_{TH}$ value(s) can be programmed using software control. Second, all the signals at baseband can be compared with multiple $V_{TH}$ values, and the best $V_{TH}$ value is selected. The threshold, gain, BBF corner frequency can use in-built self-calibration implemented on the chip. A test signal can be injected from a transmitter, and this can be used as a calibrating signal for all fixed quantities used in the measurements.

Advantages of disclosed embodiment include a fully on-chip implementation (receiver and AGC), achieving low power at low supply voltage, and fast detection with high signal integrity. Low die area is also achieved as well as programmability of the latency, and pulse duty cycle via digital control bits using software.

Figure 4:
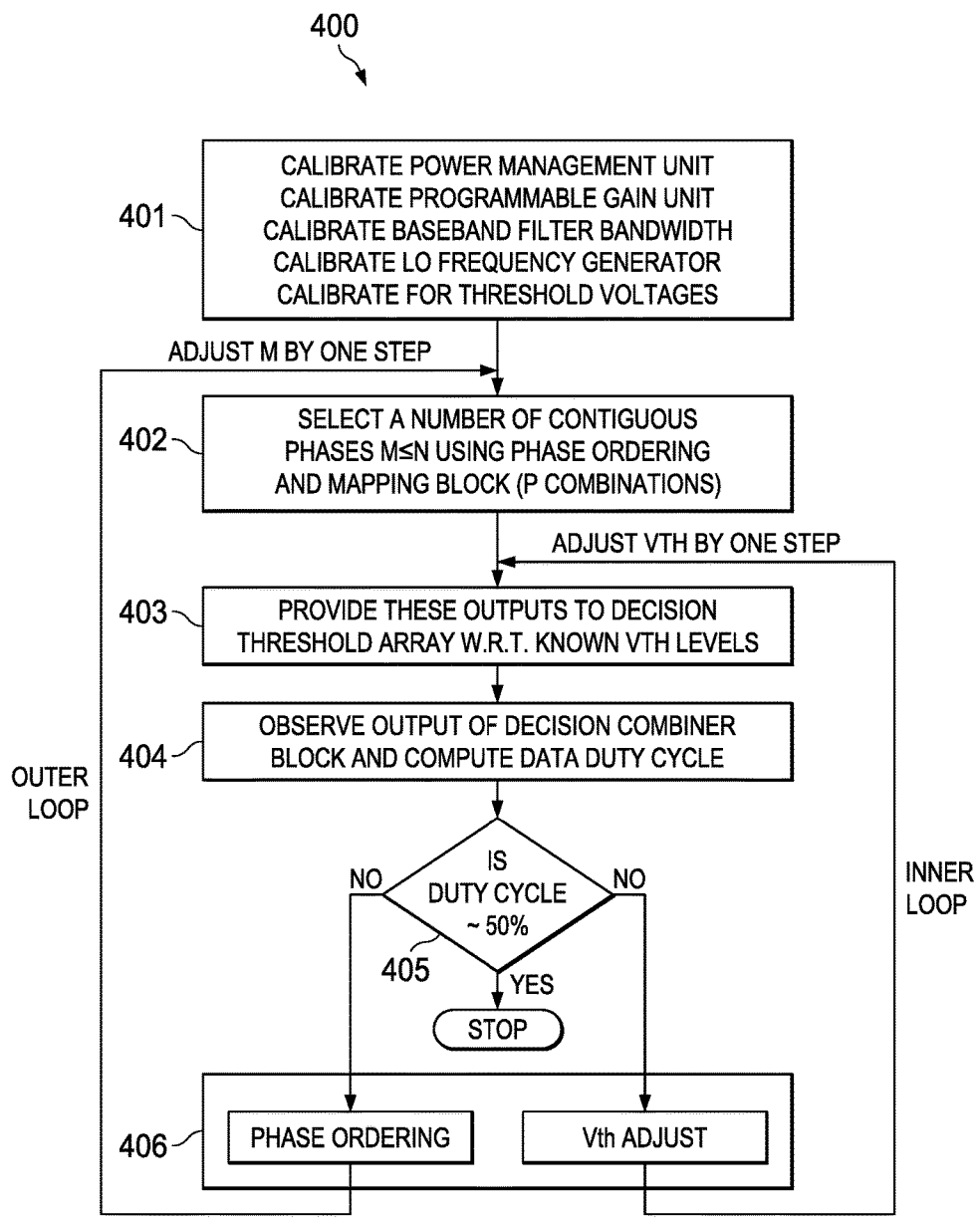
FIG. 4 is flow chart that shows steps in an example method of low latency multi-amplitude modulation receiving.

FIG. 4 shows steps in an example method 400 of low latency multi-amplitude modulation receiving. Step 401 comprises optionally performing at least one receiver calibration. For example, calibration can comprise (a) power management unit calibration for generating precise voltage and currents, (b) programmable gain block calibration for compensating for coil variations (for wireless power transfer applications) and ensuring that the received signal swing at the input of the baseband stages are a fixed value irrespective of the amplitude of the received signal at the signal coupling element, so that the signal to noise ratio is maximized, (c) baseband filter bandwidth calibration to ensure that the power path signal (undesired signal) is sufficiently rejected so that signal to noise ratio (SNR) is maximized at the decision threshold block, (d) LO frequency generator calibration to ensure correct center frequency generation for the down-conversion operation, and (e) threshold voltage calibration to ensure that the $V_{TH}$ levels are correctly set. Typically the static calibrations are performed using precise voltage and currents generated by an external precise tester, and the dynamic calibrations (signal dependent calibrations) are performed by using known tone injections to the signal coupling elements.

After the optional calibration steps are performed, in step 402 a subset being M number of contiguous waveforms are selected out of N phases in the receiver, where the phase difference between each of the contiguous phases is $(2\pi/N)$, where N is the divider order. Typically M=N, but a smaller subset M (M<N) may be used to improve latency. For example, as described above, when 4 phases are used for detection, the rising edge can use contiguous phase (1, 2, 3, 4) while the falling edge may use phases (1, 2, 3) to achieve low latency.

In step 403 the M outputs are then provided to the decision threshold block 105 for comparison, and in step 404 the data output from the decision combiner block 106 is observed. Step 405 comprises comparing the measured duty cycle of the data output to 50%. To compute the duty-cycle of the data output two example methods can be used being (a) a long term average over a designated time window which should be close to half the supply voltage that the output signal is referenced to for a 50% duty-cycle [e.g. a 2 MHz received signal with 500 nS period and 50% duty cycle maybe averaged over 500 μS to average over 1,000 cycles], or (b) performing the same averaging, but this time on an XOR'd waveform of the output and it's 90° or other but known phase shifted version to reduce the number of cycles needed for averaging. This averaging can be a part of initial calibration to avoid latency of the operation. In a step shown as step 406 identified as a 'loop' the phase ordering M in an outer loop and $V_{TH}$ in an inner loop are shown being adjusted until a duty cycle substantially close to 50% (substantially close to 50% defined above as being in the range from 48% to 52%) is achieved and the method then is stopped. At this point, to ensure lowest possible latency a low $V_{TH}$ value is used for thresholding the rising edge.

Disclosed pulse amplitude modulation receivers can be utilized for a variety of communications applications. One specific application for disclosed multi-amplitude modulation receivers is for wireless power transfer. In this case because a power supply can render the overall solution too bulky a known concept reduces the area of the inductors, so that the coil responsible for Rx/Tx of the data path signals may be physically placed in the in-plane direction inside the outer power coil and may only be 10s of mm apart from one another. However, this causes power path to data path coupling, where the wireless power path signal magnetically couples to the signal in data path, and where the power path signal can often be of a significantly higher magnitude than the desired signal. Two different frequencies (but typically both known and precise) are used for communication for the power path and the data path, respectively. The power path uses a lower frequency, and the coupled energy into the data path is generally significantly higher than that of the data signal in the data path. Demodulation of data path signal including removing the coupled in power path signal is needed to be performed with low latency and with low power consumption that can be provided by disclosed multi-amplitude modulation receivers.

Figure 5A:
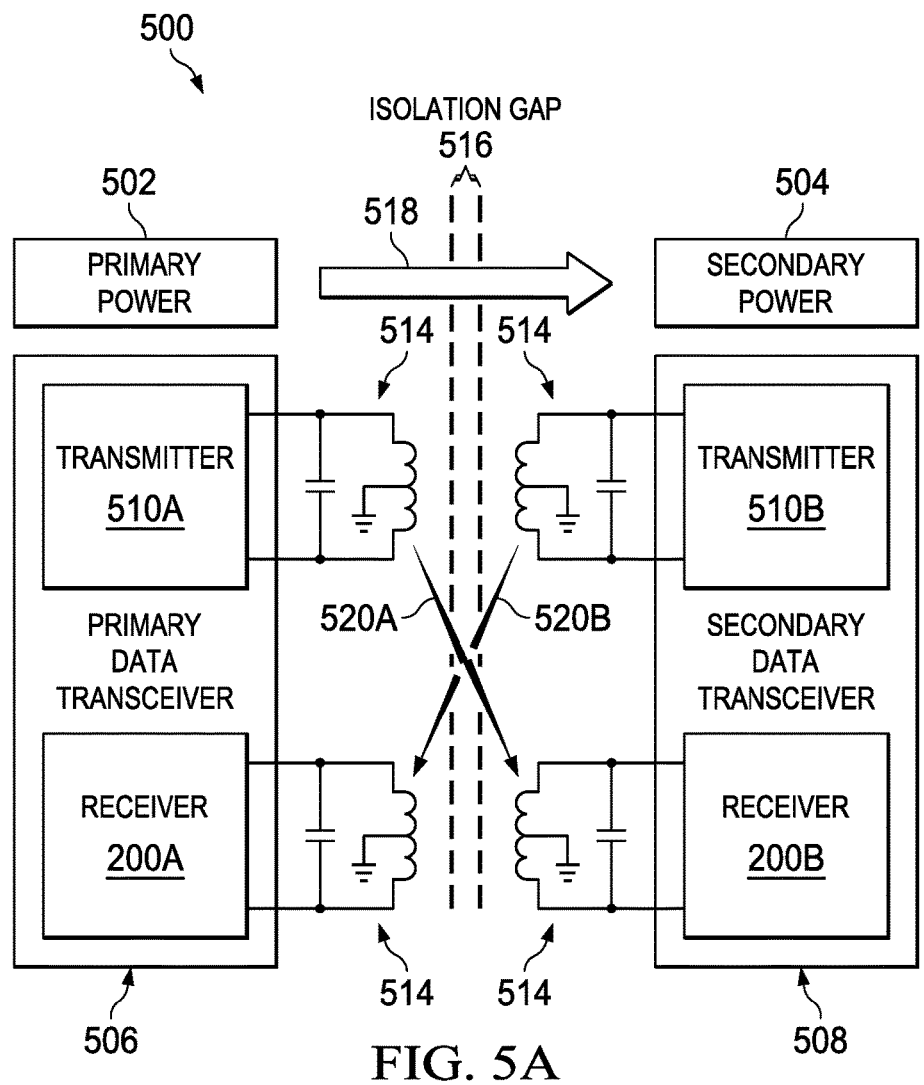
FIG. 5A shows a high level block diagram for a system for wireless power and data transmission including a primary data transceiver and a secondary data transceiver providing wireless power transfer that each include a disclosed multi-amplitude modulation receiver.

A contactless interface transceiver can include a disclosed multi-amplitude modulation receiver, such as ASK receiver 200. FIG. 5A shows a high level block diagram for a system for wireless power and data transmission 500 including primary and secondary data transceivers 506, 508 providing wireless power transfer that each include a disclosed multi-amplitude modulation ASK receiver shown as receiver 200A and 200B, respectively.

System 500 is for isolated power and data transfer. Primary data transceiver 506 includes Primary Power block 502, which is physically separated from the Secondary Power block 504 by an isolation gap 516. Power is transmitted from Primary Power 502 to Secondary Power 504 at a known relatively low frequency as wireless signal 518. In at least one embodiment, the power is transmitted at a frequency of 6.78 MHz.

The Primary Data Transceiver 506 includes a Transmitter 510A and Receiver 200A that are each connected to an Inductor-Capacitor (LC) tank 514. Secondary Data Transceiver 508 includes Transmitter 510B and Receiver 200B, each of which is also connected to an LC tank 514. Communication between the primary side and secondary side of the system 500 takes place across isolation gap 516 in full duplex communication, i.e., Transmitter 510A transmits to Receiver 200B as Signal 520A and Transmitter 510B transmits to Receiver 200A as Signal 520B. In at least one embodiment, Receivers 200A and 200B can be identical circuits. In at least one embodiment, the isolation gap 516 measures in the range from 1 mm to 2.5 mm. In at least one other embodiment, the isolation gap 516 measures up to several tens of mms.

Figure 5B:
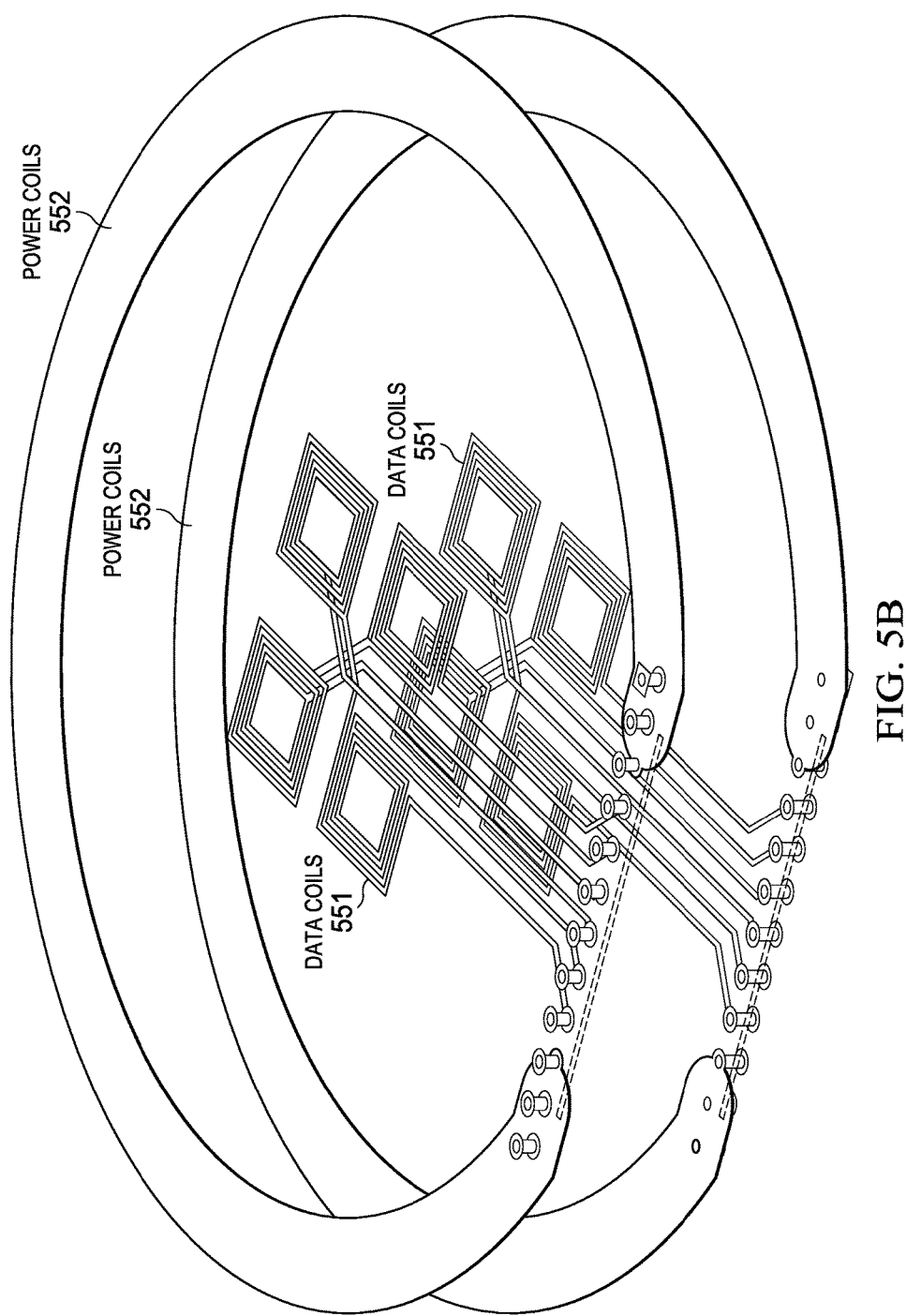
FIG. 5B shows the L in the LC tanks of the data transceiver comprising data coils enclosed inside outer power coils whose power signal gets coupled onto the data coils on its resident side.

As described above there is a challenge in the design of a wireless receiver that is part of a wireless power transmission system such as system 500, particularly when the data coils responsible for Rx/Tx of the data signals are physically placed inside the power coils such as shown in FIG. 5B described below that leads to the potential magnetic coupling of the wireless power path signal in with the data signal in data path. As seen in FIG. 5A system 500 comprises of a primary power side 502 and secondary power side 504 and although shown as a single coil for the Tx and a single coil for the Rx, the single coils may be pairs of coils on each side, one pair for the transmitter (Tx) and other for the receiver (Rx) which allow it to be a full-duplex system. The primary and secondary coils face each other and the data coils are magnetically coupled allowing simultaneous transmission and reception of data.

As shown in FIG. 5B the L in the LC tanks of the data transceiver can comprise data coils shown as 551 that are enclosed inside the power coils 552 whose power signals during operation thus gets coupled onto the data coils 551 on its resident side. The data transmission/reception is also possible with the data coils 551 in a full/half duplex configuration and without the power coils 552 present.

Without a receiver such as Receiver 200A and 200B, power harmonics of the Signal 518 provide a relatively strong blocker signal at a frequency $F_{PWR}$, which can be at 6.78 MHz, that due to magnetic coupling over a distance that may be only about 20 mm tends to 'swamp' out any data signals at frequency $F_{DATA}$, which can be at 80 MHz±2 MHz. To recover the transmitted data, unwanted components that are coupled to the received data in the data path should be removed, such as the unwanted blocker signal at 6.78 MHz, as well as any other noise that may be present in the environment that gets also coupled in. Based on the power transmitted and the separation distance in the example embodiment, a minimum blocker suppression of 40 dBc may be needed. Receivers 200A and 200B provide at least this level of blocker suppression.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. An N-phase multi-amplitude modulation receiver, comprising:
   a signal coupler block coupled to a down conversion mixer array block that includes N phases including N mixer elements which receive a first input signal from said signal coupler block and a second input from a local oscillator (LO) circuit that provides N overlapping phase signals coupled as said second input to respective ones of said N mixer elements;
   wherein outputs of said N mixer elements are coupled to a baseband filter (BBF) block that has outputs coupled to inputs of a decision threshold block including decision threshold elements each including a signal input and comprising at least one comparator that is coupled to receive at least one voltage threshold ($V_{TH}$) value;
   a phase ordering and mapper block coupled to said N mixer elements that selects M out of said N phases by enabling M out of said N mixer elements, wherein M and N are integers;
   a digital logic and control block coupled to control a filter gain and corner frequency of said BBF block and control said $V_{TH}$ value for said decision threshold block, said decision threshold block for comparing a signal received to said $V_{TH}$ value,
   wherein outputs from said decision threshold block are coupled to inputs of a M-input decision combiner which provides a single data output.

2. The receiver of claim 1, further comprising a programmable gain block between said signal coupler block and said mixer array block.

3. The receiver of claim 2, wherein said programmable gain block provides signal attenuation depending on digital controls provided by said digital logic and control block.

4. The receiver of claim 1, wherein said decision threshold block has N decision elements, with each said decision threshold elements comprising a plurality of thresholding elements.

5. The receiver of claim 1, wherein said N mixer elements comprise transistors with voltage mode switches.

6. The receiver of claim 1, wherein said N mixer elements comprise transistors with current mode switches.

7. The receiver of claim 1, wherein said $V_{TH}$ value comprises a first $V_{TH}$ value used by said decision threshold block for rising edge detection and a second $V_{TH}$ value used by said decision threshold block for falling edge detection, and
   wherein an absolute value of said second $V_{TH}$ value is higher than an absolute value of said first $V_{TH}$ value.

8. The receiver of claim 1, wherein said LO circuit comprises a ring oscillator providing N overlapping phases.

9. The receiver of claim 1, wherein said M-input decision combiner comprises an M-input OR gate providing said single data output.

10. The receiver of claim 1, further comprising a substrate having a semiconductor surface that said receiver is formed on.

11. The receiver of claim 10, wherein said receiver is integrated on said substrate as part of an integrated circuit (IC) comprising a contactless interface transceiver, said contactless interface transceiver comprising:
   a Primary Data Transceiver including a Transmitter and said Receiver each adapted to be coupled to an Inductor-Capacitor (LC) tank that provides said signal coupler block, and wherein said Inductor (L) for at least said receiver comprises data coils and power coils, wherein said data coils are in an in-plane direction enclosed inside said power coils.

12. A method of multi-amplitude modulation receiving for an N phase receiver, comprising:
   selecting M number of contiguous waveform outputs from said N phases wherein said M≤said N using at least one voltage threshold ($V_{TH}$) value applied to mixer inputs of N mixer elements of a mixer array block also coupled to receive a first input signal from a signal coupler block and a second input from a local oscillator (LO) circuit that provides N overlapping phase signals coupled as said second input to respective ones of said N mixer elements, wherein M and N are integers;
   providing said M waveform outputs to inputs of a decision threshold block for comparison;
   generating a single data output using an M-input decision combiner coupled to an output of said decision threshold block;
   comparing a measured duty cycle of said single data output to 50%, and
   if said measured duty cycle is not with a predetermined duty cycle range including said 50%, adjusting said M or said $V_{TH}$ value until said measured duty cycle is within said predetermined duty cycle range.

13. The method of claim 12, further comprising adding a programmable gain or attenuation between said signal coupler block and said mixer array block.

14. The method of claim 12, further comprising performing at least one receiver calibration.

15. The method of claim 12, wherein said $V_{TH}$ value comprises a first $V_{TH}$ value used by said decision threshold block for the rising edge detection and a second $V_{TH}$ value used by said decision threshold block for falling edge detection, and
   wherein an absolute value of said second $V_{TH}$ value is higher than an absolute value of said first $V_{TH}$ value.

16. The method of claim 12, wherein said predetermined duty cycle range is within 48% to 52%.

17. The method of claim 12, wherein a phase difference between each of said N phases is ($2\pi/N$), where said N is a divider order that is at least 4.

18. The method of claim 12, said N phase receiver is integrated on a substrate as part of an integrated circuit (IC) comprising a contactless interface transceiver, said contactless interface transceiver comprising:
   a Primary Data Transceiver including a Transmitter and said Receiver each adapted to be coupled to an Inductor-Capacitor (LC) tank that provides said signal coupler block, and wherein said Inductor (L) for at least said receiver comprises data coils and power coils, wherein said data coils are in an in-plane direction enclosed inside said power coils, and
   wherein said receiver provides a minimum blocker suppression of 40 dBc for a power signal from said power coils magnetically coupling onto a data path connecting to said single data output.

19. The method of claim 12, wherein said M-input decision combiner comprises an M-input OR gate providing said single data output.

20. The method of claim 12, further comprising programming said M and said $V_{TH}$ value using software.

* * * * *